US009992243B2

(12) United States Patent
DeLuca et al.

(10) Patent No.: US 9,992,243 B2
(45) Date of Patent: *Jun. 5, 2018

(54) VIDEO CONFERENCE APPLICATION FOR DETECTING CONFERENCE PRESENTERS BY SEARCH PARAMETERS OF FACIAL OR VOICE FEATURES, DYNAMICALLY OR MANUALLY CONFIGURING PRESENTATION TEMPLATES BASED ON THE SEARCH PARAMETERS AND ALTERING THE TEMPLATES TO A SLIDESHOW

(71) Applicant: International Business Machines Corporation, Armonk, NY (US)

(72) Inventors: Lisa Seacat DeLuca, San Francisco, CA (US); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 525 days.

This patent is subject to a terminal disclaimer.

(21) Appl. No.: 13/621,389

(22) Filed: Sep. 17, 2012

(65) Prior Publication Data

US 2014/0082485 A1   Mar. 20, 2014

(51) Int. Cl.
*H04L 29/06* (2006.01)
*G06K 9/62* (2006.01)
(Continued)

(52) U.S. Cl.
CPC .......... *H04L 65/403* (2013.01); *G06F 3/0481* (2013.01); *G06F 17/248* (2013.01);
(Continued)

(58) Field of Classification Search
CPC . G06F 17/212; G06F 17/248; H04L 12/1822; H04L 65/403; H04L 67/02; G06K 9/62; G06Q 10/103
(Continued)

(56) References Cited

U.S. PATENT DOCUMENTS 5,477,448 A   12/1995 Golding et al.
5,826,031 A   10/1998 Nielsen
(Continued)

OTHER PUBLICATIONS

Stack Exchange, pp. 1-3, multiple authors, http://webapps.stackexchange.com/questions/15674/how-can-i-tag-friends-in-a-youtube-video-on-facebook/2#2.*

(Continued)

*Primary Examiner* — Cesar Paula
*Assistant Examiner* — Benjamin Norris
(74) *Attorney, Agent, or Firm* — L. Jeffrey Kelly (57) ABSTRACT

In a method for customization of contextual information during a web conference presentation, a computer system executes a presentation program during a conference presentation. The computer system receives a request to access presentation templates based on parameters of a presenter, wherein the presentation templates including parameters identifying one or more of template texture, template font, template name of the presenter or template photo of the presenter of the conference presentation. In addition, the computer system determines an identity of the presenter during the conference presentation and matching the identity of the presenter against the parameter of the presenter. Moreover, the computer system extracts the presentation templates in the repository based on the match. The computer system further applies the extracted presentation template to presentation contents of the presentation program. In one aspect, the extracted presentation template alters visual (Continued)

characteristics of the presentation content based on the applied presentation template.

5 Claims, 6 Drawing Sheets

(51) Int. Cl.
    *G06F 3/0481*   (2013.01)
    *G06F 17/24*    (2006.01)
    *H04N 7/14*     (2006.01)
    *H04N 7/15*     (2006.01)
    *G06Q 10/10*    (2012.01)
    *H04L 12/18*    (2006.01)
(52) U.S. Cl.
    CPC ............. *G06K 9/62* (2013.01); *G06Q 10/103* (2013.01); *H04L 12/1822* (2013.01); *H04L 65/4023* (2013.01); *H04N 7/147* (2013.01); *H04N 7/15* (2013.01)
(58) Field of Classification Search
    USPC ................................. 715/273, 753, 204, 756
    See application file for complete search history.

(56) References Cited

U.S. PATENT DOCUMENTS

| | | |
|---|---|---|
| 6,014,638 A | 1/2000 | Burge et al. |
| 6,018,738 A | 1/2000 | Breese et al. |
| 6,041,330 A | 3/2000 | Carman et al. |
| 6,100,890 A | 8/2000 | Bates et al. |
| 6,356,922 B1 | 3/2002 | Schilit et al. |
| 6,412,012 B1 | 6/2002 | Bieganski et al. |
| 6,473,114 B1 | 10/2002 | Strubbe |
| 6,574,625 B1 | 6/2003 | Bates et al. |
| 6,580,447 B2 * | 6/2003 | Shimizu et al. ........... 348/14.11 |
| 6,732,090 B2 | 5/2004 | Shanahan et al. |
| 6,947,922 B1 | 9/2005 | Glance |
| 7,043,698 B2 | 5/2006 | Newbold |
| 7,075,000 B2 | 7/2006 | Gang et al. |
| 7,284,232 B1 | 10/2007 | Bates et al. |
| 7,412,392 B1 | 8/2008 | Satapathy |
| 7,870,497 B2 | 1/2011 | Greer et al. |
| 8,295,462 B2 | 10/2012 | Miller et al. |
| 2001/0021914 A1 | 9/2001 | Jacobi et al. |
| 2002/0078045 A1 | 6/2002 | Dutta |
| 2002/0142722 A1 | 10/2002 | Gutta et al. |
| 2005/0044508 A1 | 2/2005 | Stockton |
| 2005/0102202 A1 | 5/2005 | Linden et al. |
| 2006/0224430 A1 * | 10/2006 | Butt .................................. 705/8 |
| 2006/0259867 A1 | 11/2006 | Watson et al. |
| 2007/0028171 A1 | 2/2007 | MacLaurin |
| 2007/0061023 A1 | 3/2007 | Hoffberg et al. |
| 2007/0078832 A1 | 4/2007 | Ott et al. |
| 2007/0100650 A1 | 5/2007 | Ramer et al. |
| 2007/0100986 A1 | 5/2007 | Bagley et al. |
| 2007/0112742 A1 | 5/2007 | Dumais et al. |
| 2007/0174247 A1 | 7/2007 | Xu et al. |
| 2007/0255754 A1 | 11/2007 | Gheel |
| 2007/0266092 A1 | 11/2007 | Schweitzer, III |
| 2007/0282912 A1 * | 12/2007 | Reiner ................... A61B 5/411 |
| 2008/0040313 A1 | 2/2008 | Schachter |
| 2008/0065974 A1 | 3/2008 | Campbell |
| 2008/0077578 A1 | 3/2008 | Ozveren et al. |
| 2008/0077669 A1 | 3/2008 | Ozveren et al. |
| 2008/0091549 A1 | 4/2008 | Chang et al. |
| 2009/0094532 A1 * | 4/2009 | Lyle ..................... G06Q 10/109 715/753 |
| 2009/0271438 A1 | 10/2009 | Agapi et al. |
| 2009/0293017 A1 | 11/2009 | Carter et al. |
| 2010/0020365 A1 | 1/2010 | Do et al. |
| 2010/0036929 A1 | 2/2010 | Scherpa et al. |
| 2010/0318916 A1 * | 12/2010 | Wilkins ........................ 715/730 |
| 2012/0151309 A1 * | 6/2012 | Bastide ................ G06F 17/273 715/202 |
| 2012/0223904 A1 | 9/2012 | Arnold et al. |
| 2012/0284774 A1 * | 11/2012 | Vaughan et al. ................... 726/3 |
| 2013/0162752 A1 * | 6/2013 | Herz et al. ................. 348/14.08 |
| 2013/0304788 A1 | 11/2013 | DeLuca et al. |
| 2014/0067824 A1 | 3/2014 | DeLuca et al. |

OTHER PUBLICATIONS

Stack Exchange, pp. 1-3, multiple authors, http://webapps.stackexchange.com/questions/15674/how-can-i-tag-friends-in-a-youtube-video-on-facebook/2#2, May 25, 2011.*

Mozilla Wiki, User:Dria/On Tagging, http://wiki.mozilla.org/User:Dria/On_Tagging#auto_Tagging.

U.S. Appl. No. 14/225,856, titled "Synchronization of Contextual Templates in a Customized Web Conference Presentation," filed Mar. 26, 2014.

* cited by examiner

VIDEO CONFERENCE APPLICATION FOR DETECTING CONFERENCE PRESENTERS BY SEARCH PARAMETERS OF FACIAL OR VOICE FEATURES, DYNAMICALLY OR MANUALLY CONFIGURING PRESENTATION TEMPLATES BASED ON THE SEARCH PARAMETERS AND ALTERING THE TEMPLATES TO A SLIDESHOW

FIELD OF THE INVENTION

The present invention relates generally to web conferencing systems and more particularly to identification of one or more conference presenters during a web conference, and dynamically associating contextual presentation templates with the conference presenter in association with presentation contents of the web conference presentation.

BACKGROUND

Technical advancement in computing and communication systems has revolutionized how individuals interact from remote locations. For instance, in business or academic environments, including, for example, management or financial industries, individuals interact through conferencing systems to facilitate meetings between persons or groups of persons situated in remote locations away from one another, thereby eliminating or substantially reducing the need for expensive and time consuming business or personal travel to the meetings.

In another instance, conferencing systems can enable conference participants to conduct synchronous collaboration sessions with other conference participants from remote locations through identical copies of windows generated by conference system software applications shared by all the conference participants. In addition, a number of conferencing systems exist and have been refined to a point that they are now practical working tools for use in at least some kinds of conferencing activities. One form of a conferencing system is a speakerphone. For example, using a speakerphone, conference participants situated at remote locations can converse with other conference participants at various locations. Another form of a conferencing system is a video conference.

Video conferencing systems are adapted to broadcast a video representation from one conferencing location to other conferencing locations. Hence, conference participants present at remote locations during a video conference can be able to visually see a conference participant that is presenting from another location. Yet another form of a conferencing system is a computer based conferencing system. In particular, computer based conferencing systems are adapted to use computing systems as conferencing devices. For example, a computer based conferencing system can be equipped with a microphone, and will often have a camera as well. Further, audio and video signals of a computer based conferencing system are digitized, and can be transmitted to conference participants through a system network, such as, the Internet, to other conference participants participating in the conference.

One form of a computer based conferencing system is a web conference, such as, for example, IBM® Lotus® Sametime® (IBM, Lotus, and Sametime are trademarks of IBM Corporation in the United States, other countries, or both) and IBM® LotusLive® (IBM and LotusLive are trademarks of IBM Corporation in the United States, other countries, or both). In particular, web conferencing is a network broadcast service that can be made possible by Internet technologies, particularly on TCP/IP connections. The service allows real-time point to point communications as well as multicast communications from one sender to many receivers. In addition, web conferencing can operate to provide information of text-based messages, voice and video chat to be shared simultaneously across geographically dispersed locations. For instance, web conferencing allows users to carry on business meetings and seminars, make presentations, conduct demonstrations, provide online education and offer direct customer support.

In addition, control of a web conference session hosted by computer based conferencing systems can be shared among conference participants. As a consequence, computer based conferencing systems can increase opportunities for group work among business or network conference participants and also provide ready access to resources needed for such work, e.g., shared data or control of conference sessions or presentations between one or more participants of the conference. Further, some web conferencing systems can include notification features to conference participants, such as, for example, texting, VoIP (voice over IP) and full-motion video.

SUMMARY

In one embodiment, a method is provided for customizing contextual information in a web conference presentation. The method comprises a computer system executing a presentation program during a conference presentation. The method further comprises, the computer system receiving a request to access presentation templates in a repository based on parameters of a presenter, wherein the presentation templates including parameters identifying one or more of template texture, template font, template name of the presenter or template photo of the presenter of the conference presentation. The method further comprises, the computer system determining an identity of the presenter during the conference presentation and matching the identity of the presenter against the parameter of the presenter. The method further comprises, the computer system extracting the presentation templates in the repository based on the match. The method further comprises, the computer system applying the extracted presentation template to presentation contents of the presentation program, wherein, the extracted presentation template alters visual characteristics of the presentation content based on the applied presentation template.

In another embodiment, a computer system is provided for customizing contextual information in a web conference presentation. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises the program instructions to execute a presentation program during a conference presentation. The computer system further comprises, program instructions to receive request to access presentation templates in a repository based on parameters of a presenter, wherein the presentation templates including parameters identifying one or more of template texture, template font, template name of the presenter or template photo of the presenter of the conference presentation. The computer system further comprises, program instructions to determine an identity of the presenter during the conference presentation and matching the identity of the presenter against the parameter of the presenter. The computer system further comprises, program instructions to extract the presentation templates in the repository based on the match. The computer system further comprises, program instructions to apply the extracted presentation template to presentation contents of the presentation program, wherein the extracted presentation template alters visual characteristics of the presentation content based on the applied presentation template.

In another embodiment, a program product is provided for customizing contextual information in a web conference presentation. The program product comprises, one or more processors, one or more computer-readable memories, one or more computer-readable tangible storage devices and program instructions which are stored on at least one of the one or more storage devices for execution by at least one of the one or more processors via at least one of the one or more memories. The program product further comprises, program instructions to execute a presentation program during a conference presentation. The program product further comprises program instructions to receive request to access presentation templates in a repository based on parameters of a presenter, wherein the presentation templates including parameters identifying one or more of template texture, template font, template name of the presenter or template photo of the presenter of the conference presentation. The program product further comprises, program instructions to determine an identity of the presenter during the conference presentation and matching the identity of the presenter against the parameter of the presenter. The program product further comprises program instructions to extract the presentation templates in the repository based on the match. The program product further comprises program instructions to apply the extracted presentation template to presentation contents of the presentation program, wherein, the extracted presentation template alters visual characteristics of the presentation content based on the applied presentation template.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying figures, wherein, like reference numerals indicate like components, and:

DETAILED DESCRIPTION

The present invention comprises functionality for customizing contextual information during a web conference presentation presented to conference participants by a conference presenter or speaker in real time or replay. In one aspect, when a conference participant is participating or listening to a presentation in real time or replay, it can be difficult for the conference participant to know exactly when a conference presenter or speaker of interest is presenting, has spoken, or is speaking during the presentation.

The present invention further comprises display of contextual information to the conference participants. The contextual information includes presentation templates. In particular, the conference presenter is identified during the web presentation, and the presentation templates associated to a conference presenter are displayed during the web conference to conference participants. Further, the conference presenter is distinguished from other conference presenters during the web conference. In addition, the presentation templates are dynamically applied on presentation content currently being presented by the conference presenter.

The present invention is adapted to enable the conference participants to quickly interpret identity of a conference presenter during the presentation. The present invention further comprises personalization of the presentation templates for each conference presenter during the web conference presentation, without requiring the conference participant to directly modify the web presentation. The present invention further comprises a visual indicator that is adapted to specifically indicate to a multi tasking conference participant when a conference presenter or speaker of interest is presenting. The present invention further operates to enable the conference participant to listen to the conference presenter or read contents of a presentation slide without periodically utilizing a playback option of the presentation.

One embodiment of present invention can comprise generation of the presentation templates that are configured to be associated to a conference presenter during the web conference presentation. Specifically, the presentation templates are applied to a main presentation file when the conference presenter is presenting during the conference. In one aspect, the presentation templates can include background color, texture graphic, font styles, name of conference presenter and/or photo of the conference presenter. In one aspect, the presentation templates can be configured by each conference participant that is viewing the presentation presented by the conference presenter over a network. In another aspect, the configuration can be setup by the conference presenter. In yet another aspect, the present invention can also be configured such that a conference computing system can operate to recognize when the conference presenter is presenting or speaking during the web conference presentation.

Specifically, in one embodiment of the present invention, a presentation program is executed in a computing environment during a conference presentation hosted through a web conference. Further, a client computing device in the computing environment receives a request through the conference presentation program from a conference participant during the conference presentation to access templates in a repository or database of the computing environment. The request to access templates can be based on parameters, including for example, template textures, template font, template name of presenter or template photo of presenter that are applicable to conference presenters during the conference presentation. Further, a template program of the presentation program in the computing environment is adapted to determine an identity of the conference presenter during the conference presentation, and matches the identity of the presenter against the parameter of the presenter. In addition, the template program of the presentation program is further adapted to extract the presentation templates in the repository based on the match.

The template program further operates to apply the extracted presentation template to the presentation program of the conference presentation, wherein, the extracted presentation template alters visual characteristics of the conference presentation based on the applied presentation template. The presentation program further operates to dynamically alter or change the extracted presentation templates of on a slideshow presentation based on detected identity of a particular conference presenter. Further, once the extracted presentation templates are applied to the presentation program, the template program further operates to transmit the conference presentation containing the extracted presentation templates to a conference computer. The conference computer operates to display the conference presentation through a display agent of the conference computer from a remote location. In an embodiment, the conference computer further operates to transmit the displayed conference presentation to a client program of the client computer for display to the conference participants.

Figure 1:
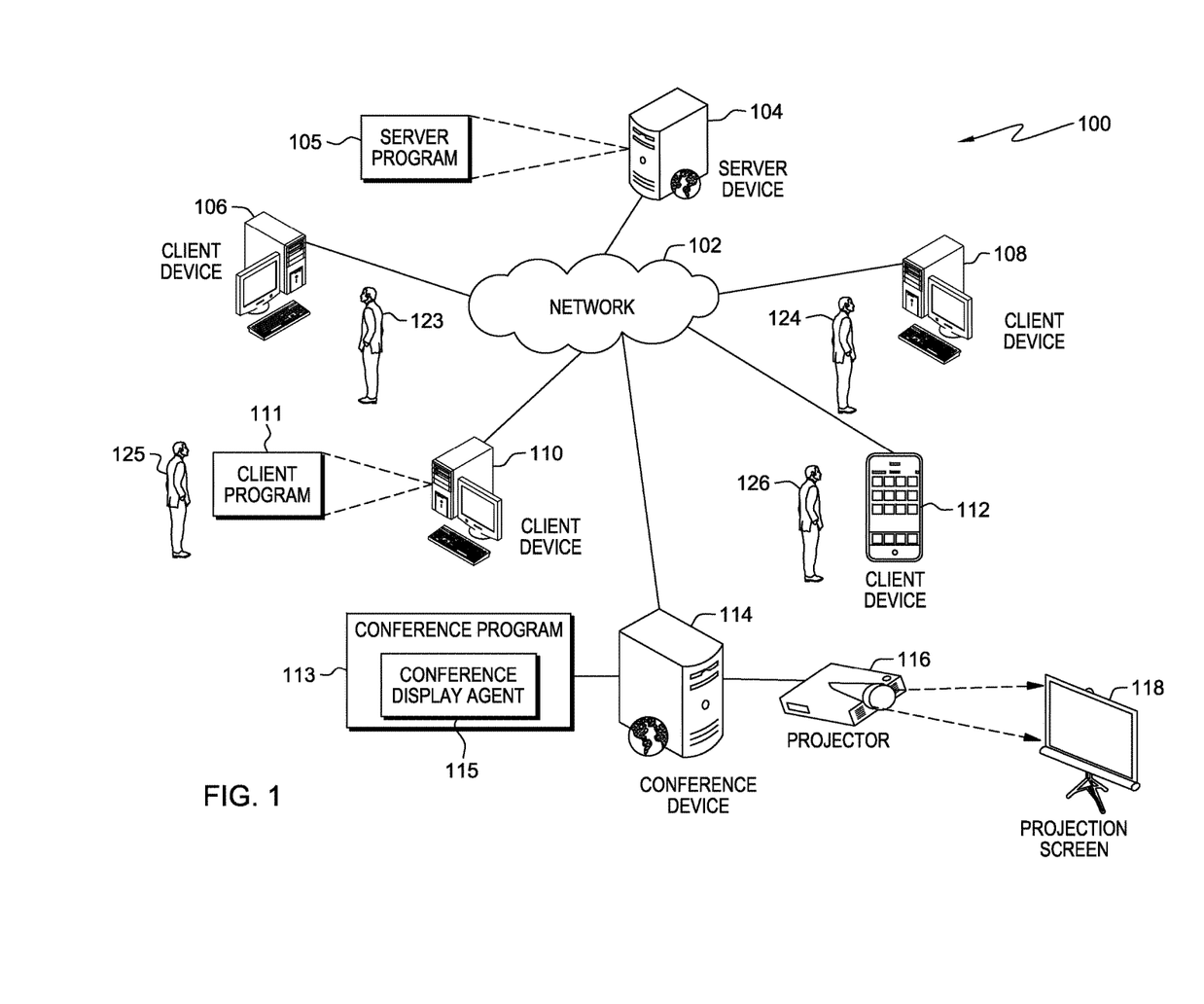
FIG. 1 illustrates a customized content web conference system for customizing contextual information in a web conference presentation for a conference presenter in accordance with an embodiment of the present invention.

Further aspects of the present invention will now be described in conjunction with the figures. Referring to FIG. 1, customized content web conference system 100 for customizing contextual information in a web conference presentation for a conference presenter or speaker during the presentation, in real time or replay in accordance with an embodiment of the present invention.

Customized content web conference system 100 comprises network 102, client computers 106, 108, 110 and 112, server device 104 and conference device 114. Client devices 106, 108, 110 and 112 are clients to server device 104 and conference device 114, interconnected over network 102. Further, client devices 106, 108, 110 and 112 operate to communicate over network 102 with server device 104 and conference device 114 to facilitate customization of contextual information in a web conference presentation by a conference participant for a conference presenter or speaker during the presentation.

Conference participants 123, 124, 125, 126 can be any type of web conference participant including, for instance, business managers that are authenticated to participate in a web conference that is broadcasted by a conference presenter to conference participants 123, 124, 125, 126 through client devices 106, 108, 110 and 112 from a remote location, in accordance with embodiments of the present invention.

Client devices 106, 108, 110 and 112 can be for example, a laptop, tablet, or notebook personal computer (PC), a desktop computer, a mainframe or mini computer, a personal digital assistant (PDA), or a smart phone, such as, a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively. Client device 110 includes client program 111. Client program 111 can be any type of software application that is compatible to retrieve and display a web conference presentation for conference participants through a web conference system, in accordance with an embodiment of the present invention. Each of client devices 106, 108, 110 and 112 can have a substantially similar copy of client program 111.

Server device 104 can be for example, a server computer system, such as, a management server, a web server, or any other electronic device or computing system capable of receiving and sending data in accordance with an embodiment of the present invention. Further, server device 104 can also represent a "cloud" of computers interconnected by one or more networks, where server device 104 can be a primary server for a computing system utilizing clustered computers when accessed through network 102. For example, such a cloud computing system can be an implementation of a web conference system that is adapted to customize contextual information or content templates in a web conference presentation by a conference participant for a conference presenter or speaker during the presentation, in real time or replay, in accordance with an embodiment of the present invention.

Server device 104 includes server program 105. Server program 105 performs all necessary functions to customize contextual information or content templates in a web conference presentation, configured for a conference participant for a conference presenter or speaker during the presentation, in real time or replay, based one or more requests that can be submitted by a conference participant via client devices 106, 108, 110 and 112 during a conference presentation, in accordance with an embodiment of the present invention as described below.

Conference device 114 can be for example, a laptop, tablet, or notebook personal computer (PC), a desktop computer, a mainframe or mini computer, a personal digital assistant (PDA), or a smart phone, such as, a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively. Conference device 114 can also be for example, a server computing system, such as, a management server, a web server, or any other electronic device or computing system capable of receiving and sending data according to one embodiment of the present invention. In one aspect of the present invention, conference device 114 can be any programmable computing device as described in further detail below.

Conference device 114 has a projector 116 connected to it as an illustrative example of a video output device. Projector 116 operates to project a video output display image on projection screen 118. In this manner, a conference presenter can use conference device 114 and projector 116 as part of a presentation to an audience of one or more conference participants.

Conference device 114 further comprises conference program 113. Conference program 113 operates to receive extracted information that comprises customized contextual information or content templates in a web conference presentation from server program 105 of server device 104, in accordance with one embodiment of the present invention. Further, conference program 113 can support packet distribution of web broadcasting including video broadcasting from conference device 114 to one or more of client devices 106, 108, 110, and 112 over network 102 with each of conference participants 123, 124, 125 and 126. Conference program 113 comprises conference display agent 115.

Conference display agent 115 evaluates the extracted customized contextual information or content presentation templates against a variety of criteria, including for example, configurations of the content presentation templates by conference participants 123, 124, 125 and 126 in client program 111 of client computers 106, 108, 110, and 112. For example, conference display agent 115 can display the configured customized contextual information on projector screen 118. Conference display agent 115 is further adapted to transmit the displayed information from a remote location from conference program 113 of conference device 114 to client program 111 of client computers 106, 108, 110, and 112 to be displayed to conference participants 123, 124, 125 and 126 in a user interface of client devices 106, 108, 110, and 112.

Network 102 includes one or more networks of any kind that can provide communication links between various devices and computers connected together within customized content web conference system 100. Network 102 can also include connections, such as, wired communication links, wireless communication links, or fiber optic cables. In addition, network 102 can be implemented as a number of different types of networks, including for example, an intranet, a local area network (LAN), or a wide area network (WAN). In the depicted embodiment, customized content web conference system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other conferencing computing systems that are utilized to host conference presentation from remote locations, according to an embodiment of the present invention.

Figure 2:
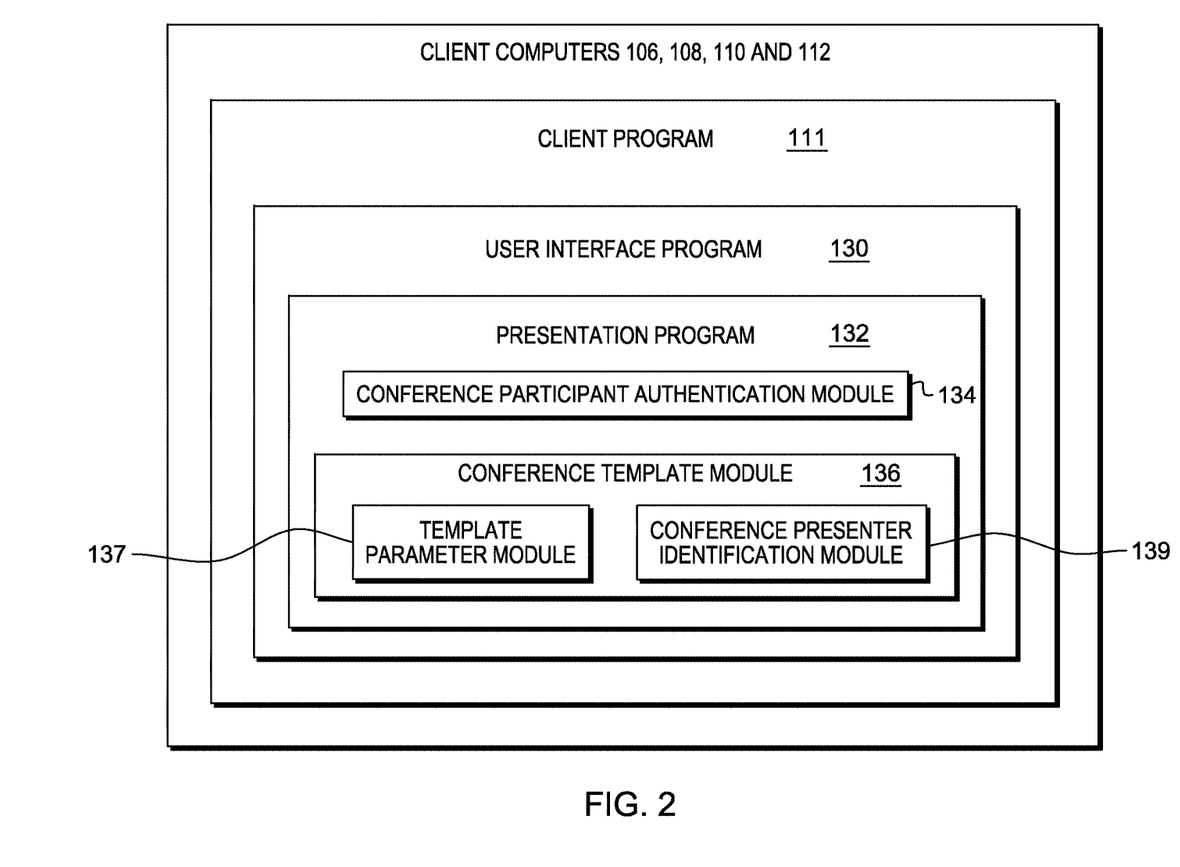
FIG. 2 is a functional block diagram illustrating components of a client program of the client devices of FIG. 1, in accordance with an embodiment of the present invention.

FIG. 2 is a functional block diagram illustrating components of client program 111 of client devices 106, 108, 110 and 112 of FIG. 1, in accordance with an embodiment of the present invention.

In the depicted embodiment, client program 111 retrieves and displays information accessible via network 102, such as, for example, customized contextual content templates associated to a conference presenter or speaker during a web conference presentation. The contextual content templates can be displayed in a user interface of client devices 106, 108, 110, and 112 for viewing by conference participants 123, 124, 125 and 126, in accordance with an embodiment of the present invention. Client program 111 can be a web browser, a standalone web page management application, web conference application, a data management software application, or part of a service that operates to provide a web conference presentation to conference participants 123, 124, 125 and 126. Further, a web page or software application received in client program 111 can include program code, such as, HyperText Markup Language (HTML) code or JavaScript code that when executed, adds one or more user interface elements to a user interface of client program 111.

In one example, web browsers of client program 111 that can operate according to embodiments the present invention, can include Internet Explorer® (Internet Explorer is a trademark of Microsoft Inc., in the United States, other countries, or both), Firefox® (Firefox is a trademark of Mozilla Corporation, in the United States, other countries, or both), Safari® (Safari is a trademark of Apple, Inc. in the United States, other countries, or both) and Google Chrome™ (Google Chrome is a trademark of Google, Inc. in the United States, other countries, or both), respectively. In another example, examples of web conference program applications that can operate according to embodiments of the present invention, can include IBM® Lotus® Sametime® (IBM, Lotus, and Sametime are trademarks of IBM Corporation in the United States, other countries, or both), IBM® LotusLive® (IBM and LotusLive are trademarks of IBM Corporation in the United States, other countries, or both), Adobe Connect® (Adobe Connect is a trademark of Adobe Systems Incorporated), IBM Lotus Sametime Unyte (IBM, Lotus, Sametime and Unyte are trademarks of IBM Corporation in the United States, other countries, or both) or WebEx® (WebEx is a trademark of Cisco Systems Inc., in the United States, other countries, or both).

Client program 111 comprises user interface program 130. User interface program 130 is a plug-in or add-on software application that extends the functionality of client program 111 by adding additional user interface elements to a user interface of client program 111. The additional user interface elements operate to authenticate credentials of conference participants 123, 124, 125 and 126. Once authenticated, conference participants 123, 124, 125 and 126 have access to join and participate in a streaming web conference broadcasted over network 102, in accordance with embodiments of the present invention. Further, the additional user interface elements of user interface program 130 further operate to distinguish a conference presenter from one or more conference presenters during a web conference, and dynamically apply a presentation template based on color, graphics, font style etc., to contents of a presentation slide currently being display on user interface program 130 during the web conference presented by the one or more conference presenters. In one aspect, user interface program 130 is configured to dynamically display applicable content to the presentation slides associated to the conference presenter during the web conference, based on operations performed by server program 105 of server device 104 as explained below. User interface program 130 includes presentation program 132.

Presentation program 132 operates to dynamically configure and display information that addresses topics currently being covered by one or more conference presenters during a conference presentation. Presentation program 132 can be part of a web conference presentation, in accordance with at least one embodiment of the present invention. Presentation program 132 dynamically displays information on user interface program 130 in the form of a slide show. In addition, presentation program 132 further operates to allow conference presenters to create a slideshow that address topics being covered by the conference presenters during the web conference over network 102. In one aspect, slides can be printed or displayed on projection screen 118 of conference device 114 and navigated through at the command of the conference presenter. The slideshow presentation dynamically displayed can be transmitted by conference program 113 of conference device 114 to presentation program 132 and displayed to conference participants 123, 124, 125 and 126 on client devices 106, 108, 110 and 112. Presentation program 132 includes conference participant authentication module 134 and conference template module 136.

Conference participant authentication module 134 operates in a traditional manner with an authentication program of server device 104 to validate conference participant userIDs and passwords that are entered to permit access to presentation program 132 and server program 105 of server device 104. In particular, a conference userID and password is submitted by conference participants 123, 124, 125 and 126 as unique credentials that are authenticated to allow conference participants 123, 124, 125 and 126 to view a web conference presentation presented by one or more conference presenters over network 102. Once unique credentials of conference participants 123, 124, 125 and 126 are authenticated, conference template module 136 operates to allow conference participants 123, 124, 125 and 126 to join the web conference broadcasted over network 102. Conference template module 136 further allows each conference presenter of the web conference to configure a presentation template to be displayed on presentation program 132 of user interface 130 during the web conference presentation, based on template parameters that are associated to the conference participants 123, 124, 125 and 126. Conference template module 136 includes template parameter module 137 and conference presenter identification module 139.

Template parameter module 137 allows conference participants 123, 124, 125 and 126 to select presentation templates based on search parameters identifying one or more of template texture, template font and template name of conference presenter or template photo of conference presenters to be associated to the conference presenters during the web conference presentation, in accordance with embodiments of the present invention. In one aspect, template parameter module 137 further operates to allow conference participants 123, 124, 125 and 126 to distinctively configure an agenda for the web conference based on the selected presentation templates that are in the search parameters. Conference presenter identification module 139 allows conference participants 123, 124, 125 and 126 to identify one or more conference presenters to be associated with the presentation templates based on the search parameters selected by conference participants 123, 124, 125 and 126 in template parameters module 137.

Conference presenter identification module 139 further operates to associate the search parameters in template parameter module 137 with the one or more conference presenters based on content, including for example, a slideshow presentation currently being presented by the one or more conference presenters and displayed to conference participants 123, 124, 125 and 126 in user interface 130 of presentation program 132. For example, conference participants 123, 124, 125 and 126 can include an agenda identifying search parameters in template parameter module 137, and identify conference presenters in conference presenter identification module 139 that specifies the following criteria: First conference presenter Bob: "I want Bob to be designated a blue presentation template"; second conference presenter Sue: "I want Sue to be designated a green presentation template"; third conference presenter Mary: "I want Mary to be designated a yellow presentation template"; etc.

The search parameters in template parameters module 137, and identification of one or more conference presenters based on the search parameters in conference presenter identification module 139 can be sent to server program 105 by client program 111 in response to conference participants 123, 124, 125 and 126 pressing a submit button (not shown) on presentation program 132 to submit search information identified in template parameters module 137 and conference presenter identification module 139. Once the search information is submitted, server program 105 performs all necessary steps to distinguish a conference presenter from one or more conference presenters during a web conference, and dynamically associate a presentation template based on color, graphics, font style etc., on content currently being display on user interface program 132 of client devices 106, 108, 110 and 112 during the web conference presented by one or more conference presenters.

Figure 3:
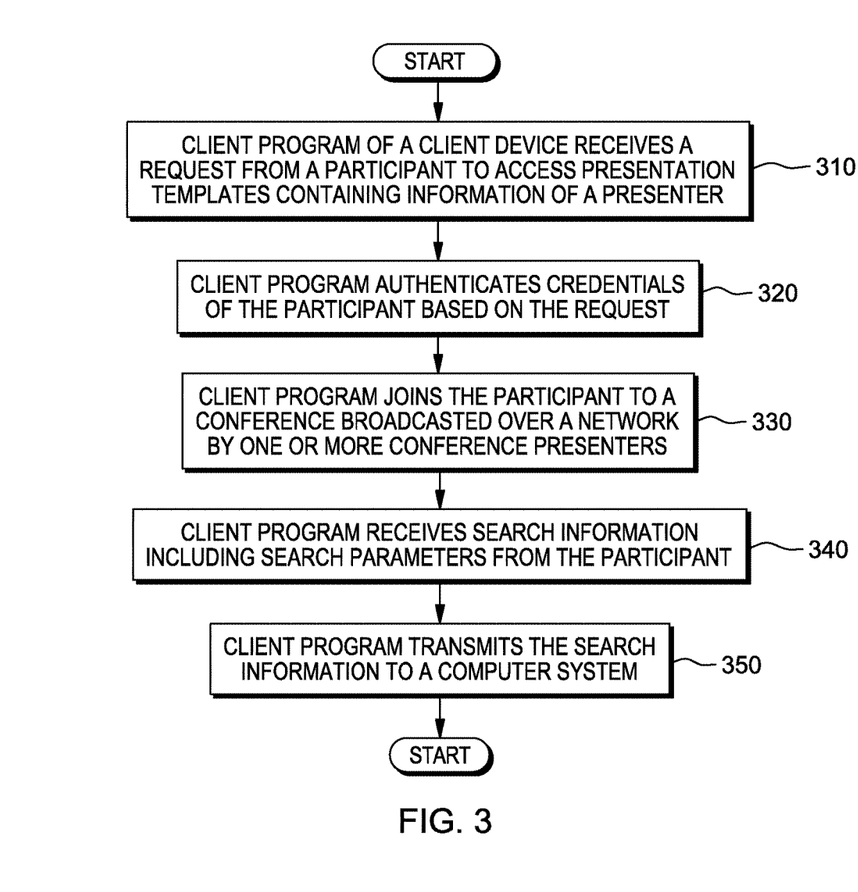
FIG. 3 is a flowchart depicting the steps performed by a client program of the client devices of FIG. 1, in accordance with an embodiment of the present invention.

FIG. 3 is a flowchart depicting the steps performed by client program 111 of client devices 106, 108, 110, and 112 of FIG. 1, in accordance with an embodiment of the present invention.

In step 310, client program 111 receives a request to access presentation templates containing information of conference presenter to be displayed on user interface program 130 of client devices 106, 108, 110, and 112 during a web conference presented by the conference presenter. Specifically, presentation program 132 of client program 111 dynamically displays information that addresses topics currently being covered by the one or more conference presenters during the web conference presentation in a form of a slide show. In step 320, client program authenticates credentials of conference participants 123, 124, 125 and 126 based on request by conference participants 123, 124, 125 and 126 to join a web conference, presented by one or more conference presenters. In step 330, client program 111 joins conference participants 123, 124, 125 and 126 to the web conference that is presented by one or more conference presenters and broadcasted over network 102 of FIG. 1.

In step 340, client program 111 receives search information including search parameters from conference participants 123, 124, 125 and 126. In particular, conference template module 134 receives an input that indicates an intention by conference participants 123, 124, 125 and 126 to selectively distinguish one or more conference presenters during the web conference, and dynamically apply presentation templates based on search parameters identifying one or more template texture, template font, template name of conference presenter or template photo of conference presenter on content currently being presented to the conference presenter, wherein conference participants 123, 124, 125 and 126 are allowed to identify, and associate the presentation templates with the conference presenters. In step 350, client program 111 transmits the search information to server program 104 of server device 105.

Figure 4:
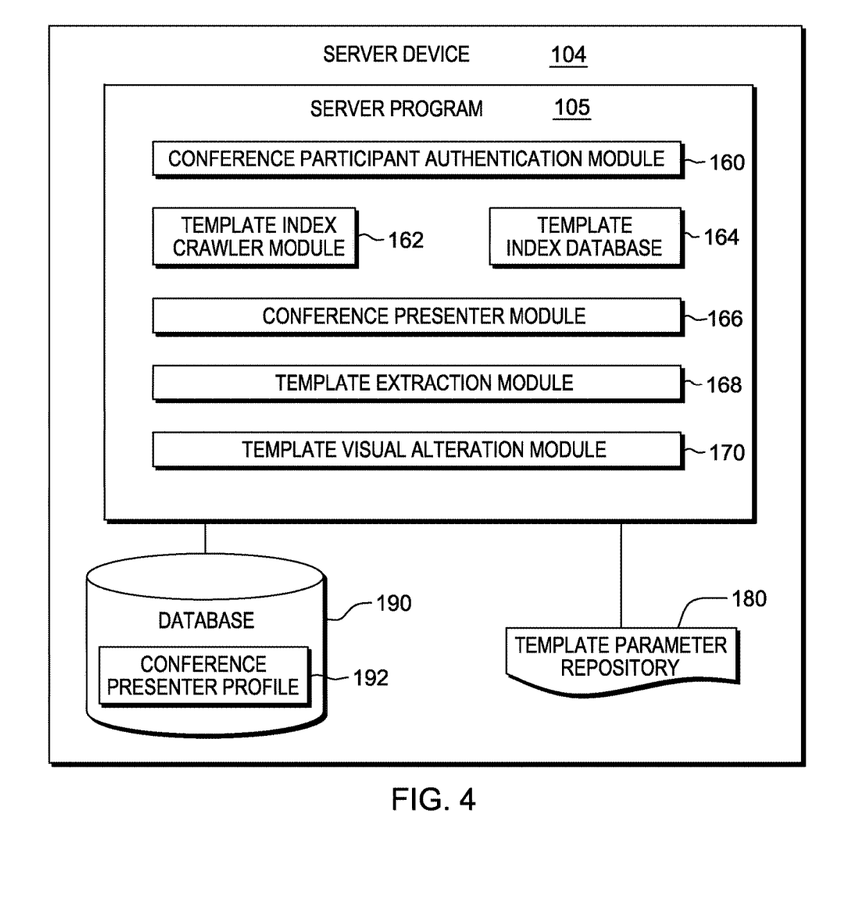
FIG. 4 is a functional block diagram illustrating components of a server program of the server device of FIG. 1, in accordance with an embodiment of the present invention.

FIG. 4 is a functional block diagram illustrating components of server program 105 of server device 104 of FIG. 1, in accordance with an embodiment of the present invention.

Server program 105 operates to distinguish a conference presenter from one or more conference presenters during a web conference, and dynamically apply and transmit a presentation template based on color, graphics, font style etc., on content presented by the distinguished conference presenter. Server program 105 includes conference participant authentication module 160, template parameter repository 180, database 190, template index crawler module 162, template index database 164, conference presenter module 166, template extraction module 168, and template visual alteration module 170.

Database 190 can be any type of storage device, storage server, storage area network, redundant array of independent discs (RAID), cloud storage device, or any type of data storage. In particular, the information in the documents stored in database 190 includes information pertaining to distinctive credentials of one or more conference presenters. In one aspect, these credentials are utilized by server program 105 to distinguish the one or more conference presenters during a web conference. Database 190 includes conference presenter profiles 192.

Conference presenter profile 192 includes identification information related to each conference presenter during a web conference joined by conference participants 123, 124, 125 and 126. In particular, identification information stored by conference presenter profile 192 includes names of presenters, presentation dates of presenters, presentation topics of presenters etc. In one aspect, conference presenter profile 192 stores identification information of one or more presenters based on information submitted by conference participants 123, 124, 125 and 126 from presentation program 132. Template parameter repository 180 provides storage, versioning, metadata, security, as well as indexing and retrieval of documents, wherein the documents include template parameters, such as, template textures, template fonts, template name of one or more conference presenter or template photo of one or more conference presenters, wherein the template parameters are stored by template parameter repository 180 and configured to be associated with information pertaining to the one or more conference presenters identified and submitted to server device 104 by conference participants 123, 124, 125 and 126 in client program 111 of client devices 106, 108, 110, and 112.

In one embodiment, template index crawler module 162 operates to collect template parameters for each conference presenter based on template parameters stored in template parameter repository 180 as input, and stores the template parameters in template index database 164. Therefore, template parameters that can be selected by conference participants 123, 124, 125 and 126 in presentation program 132 are stored in template index database 164 by template index crawler module 162. In this manner, the selected template parameters can be easily accessible for retrieval based on information submitted to server program 105 by client program 111. In this manner, any search information submitted to server program 105 pertaining to one or more template parameters supplied by conference participants 123, 124, 125 and 126 in user interface program 130 is searched and identified in template index database 164 by server program 105. In particular, information identified in template index database 164 is mapped onto information pertaining to one or more conference presenters stored in conference presenter profile 192, and a conference ID is generated by template index database 164 for the one or more conference presenters based on the mapped information in template index database 164 and conference presenter profile 192 of database 190. In one aspect, the conference ID specifically designates template parameters for the one or more conference presenters that identifies at least one of the following: template texture, template font, template name of the presenter or template photo of the presenter of the conference presentation included in search information submitted by conference participants 123, 124, 125 and 126 in client program 111 to server program 105, in accordance with embodiments of the present invention.

In another embodiment, conference presenter module 166 operates to identify one or more conference presenters based on voice recognition, analyzing of telephone input lines, agenda topics conference participants 123, 124, 125 and 126 for the web conference or manual selection of conference presenter in template parameter module 137 of presentation program 132. Conference presenter module 166 recognizes when the conference presenter is presenting or speaking during the web conference presentation. In one example, when the conference presenter is presenting or speaking during the web conference presentation, conference presenter module 166 will designate a specific presentation template stored in template parameter repository 180 that applies to the conference presenter based on selection of the presentation templates by conference participants 123, 124, 125 and 126 in template parameter module 137. Therefore, when a new conference presenter is found, the identity of the conference presenter is determined using known speaker identification techniques.

Further, once the identity of the conference presenter is determined by conference presenter module 166, conference presenter module 166 does a lookup to determine if the conference presenter that is identified corresponds to a configured presentation template in template parameter repository 180. In one aspect, the mapping of a presentation template to a conference presenter can be in the form of a data storage or a key value system in which the conference presenter is the key and the value is the template to use. For example, if the matching algorithm does not find a suitable template, a default template can be applied or the current template can remain. On the other hand, if the matching algorithm does find a suitable template, the found template is applied to presentation program 111 of client devices 106, 108, 110, and 112. The conference system continues to monitor for changes in conference presenter and repeats. Further, identification of the conference presenter can be done by voice recognition, analysis of telephone input lines, agenda topics, manual entries, etc. After the conference presenter has completed presenting a conference, the presentation templates are adapted to return to a default template or can be replaced by the next conference presenter's template, according to an embodiment of the present invention.

Template extraction module 168 operates to match the conference presenter against template parameters in template index database 164. Template extraction module 168 further operates to extract the presentation templates in template index database 164 based on the matched identity of the conference presenter during the conference presentation. Template visual alteration module 170 operates to dynamically apply the extracted presentation template to presentation contents currently being specifically presented on user interface program 132 and displayed to conference participants 123, 124, 125 and 126. In particular, template visual alteration module 170 dynamically applies presentation templates to template index database 164 designated for each conference presenter on content presented by one or more conference presenter. Template visual alteration module 170 transmits the content including the applied presentation templates, associated with the one or more conference presenters currently presenting a slide show presentation on presentation program 132 to conference device 114 of FIG. 1, for display on projector screen 118. Conference device 114 transmits the displayed content to client computing devices 106, 108, 110 and 112 over network 102, in accordance with embodiments of the present invention.

Figure 5:
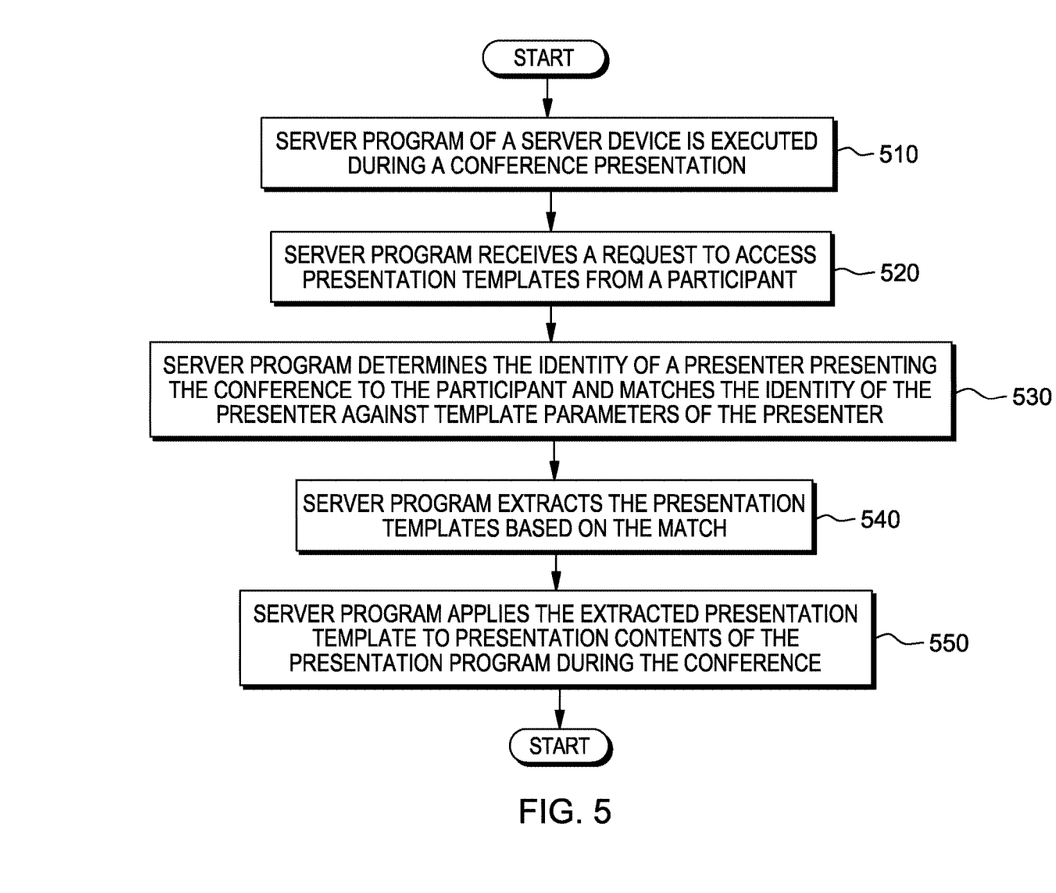
FIG. 5 is a flowchart depicting steps performed by a server program of a server device, in accordance with an embodiment of the present invention.

FIG. 5 is a flowchart depicting steps performed by server program 105 of server device 104, in accordance with embodiments of the present invention.

In step 510, server program 105 is executed during a web conference presented by one or more presenters over network 102. In step 520, server program 105 receives a request from client program 111 to access presentation templates in template parameter repository 180 based on parameters of one or more conference presenters. Further, the presentation templates include parameters identifying one or more of template texture, template font, template name of the presenter or template photo of the presenter of the conference presentation. In step 530, server program 105 identifies one or more presenters presenting during the conference. In one aspect, information pertaining to one or more presenters is stored in conference presenter profile 192 of database 190. Further, server program 105 matches the presenter against presentation templates in template parameter repository 180. In step 540, server program extracts the presentation templates associated with presenter from template index database 164. In step 550, server program 105 applies the extracted presentation template to presentation contents of presentation program 132, wherein the presentation templates alters visual characteristics of the presentation contents based on the applied presentation template.

Figure 6:
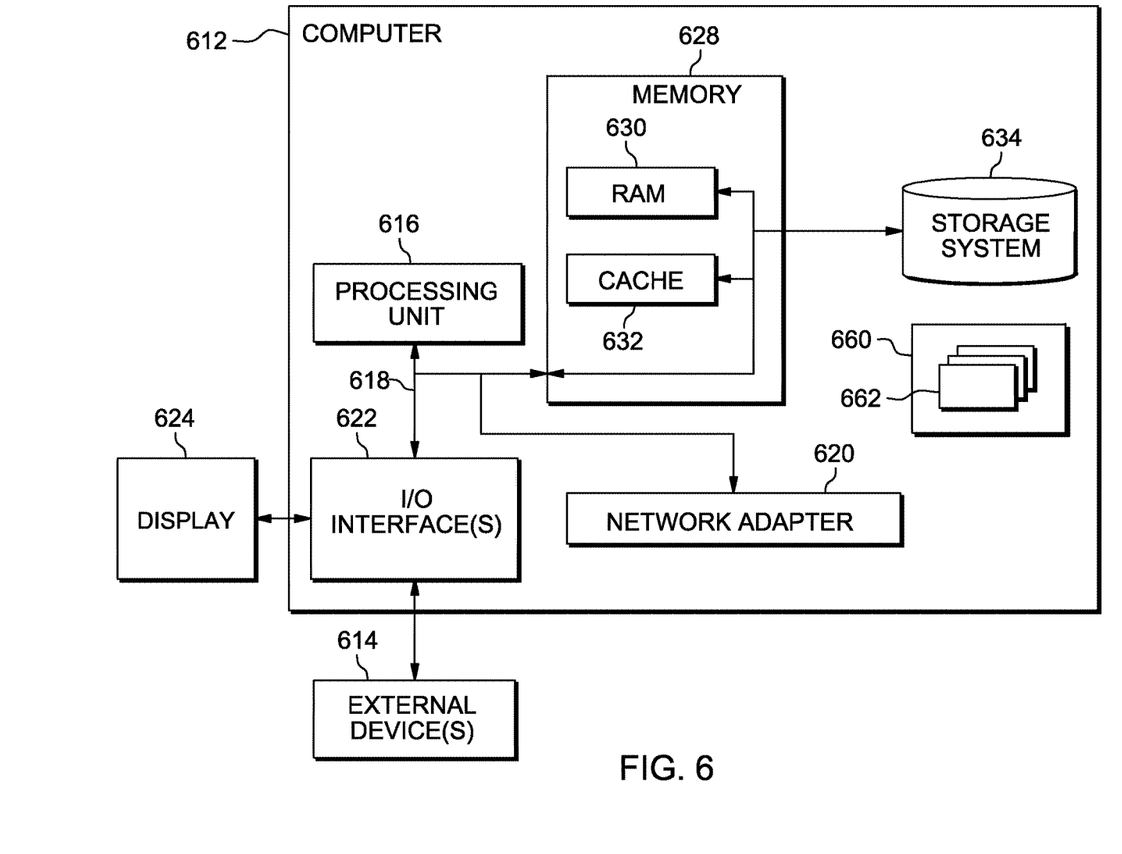
FIG. 6 is a functional block diagram of a computer system, in accordance with an embodiment of the present invention.

FIG. 6 is a functional block diagram of a computer system, in accordance with an embodiment of the present invention is shown.

Computer system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove.

In computer system 600 there is computer 612, which is operational with numerous other general purpose or special purpose computing system environments or configurations. Examples of well-known computing systems, environments, and/or configurations that can be suitable for use with computer 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of devices 104, 106, 108, 110, 112, and 114 can include or can be implemented as an instance of computer 612.

Computer 612 can be described in the general context of computer system executable instructions, such as, program modules, being executed by a computer system. Generally, program modules can include routines, programs, objects, components, logic, data structures, and so on that perform particular tasks or implement particular abstract data types. Computer 612 can be practiced in distributed cloud computing environments where tasks are performed by remote processing devices that are linked through a communications network. In a distributed cloud computing environment, program modules can be located in both local and remote computer system storage media including memory storage devices.

As further shown in FIG. 6, computer 612 is shown in the form of a general-purpose computing device. The components of computer 612 can include, but are not limited to, one or more processors or processing units 616, memory 628, and bus 618 that couples various system components including memory 628 to processing unit 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 612 typically includes a variety of computer system readable media. Such media can be any available media that is accessible by computer 612, and includes both volatile and non-volatile media, and removable and non-removable media.

Memory 628 can include computer system readable media in the form of volatile memory, such as, random access memory (RAM) 630 and/or cache 632. Computer 612 can further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as, a CD-ROM, DVD-ROM or other optical media can be provided. In such instances, each can be connected to bus 618 by one or more data media interfaces. As will be further depicted and described below, memory 628 can include at least one program product having a set (e.g., at least one) of program modules that are configured to carry out the functions of embodiments of the invention.

Program 660, having one or more program modules 662, can be stored in memory 628 by way of example, and not limitation, as well as an operating system, one or more application programs, other program modules, and program data. Each of the operating system, one or more application programs, other program modules, and program data or some combination thereof, can include an implementation of a networking environment. Program modules 662 generally carry out the functions and/or methodologies of embodiments of the invention as described herein. Each one of client program 111, server program 105, and conference program 113 can be implemented as or can be an instance of program 660.

Computer 612 can also communicate with one or more external devices 614, such as, a keyboard, a pointing device, etc., as well as display 624; one or more devices that enable a user to interact with computer 612; and/or any devices (e.g., network card, modem, etc.,) that enable computer 612 to communicate with one or more other computing devices. Such communication can occur via Input/Output (I/O) interfaces 622. Still yet, computer 612 can communicate with one or more networks, such as, a local area network (LAN), a general wide area network (WAN), and/or a public network (e.g., the Internet) via network adapter 620. As depicted, network adapter 620 communicates with the other components of computer 612 via bus 618. It should be understood that although not shown, other hardware and/or software components can be used in conjunction with computer 612. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions can be provided to a processor of a general purpose computer, special purpose computer, or other programmable data processing apparatus to produce a machine, such that instructions which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as, Java, Smalltalk, C, and C++. The program code can execute entirely on the user's computer, partly on the user's computer, as a stand-alone software package, partly on the user's computer and partly on a remote computer, or entirely on a remote computer or server. In the latter scenario, the remote computer can be connected to the user's computer through any type of network, including a local area network (LAN) or a wide area network (WAN), or the connection can be made to an external computer (for example, through the Internet using an Internet service provider). Alternatively, the functions of the aforementioned programs can be implemented in whole or in part by computer circuits and other hardware (not shown).

Based on the foregoing, a computer system, method and program product has been disclosed in accordance with the present invention. However, numerous modifications and substitutions can be made without deviating from the scope of the present invention. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims. Therefore, the present invention has been disclosed by way of example and not limitation.

What is claimed is:

1. A method for customizing contextual information in a web conference presentation within a computer system, the method comprising the steps of:

executing a presentation program during a conference presentation; receiving a request to access presentation templates in a repository, wherein the presentation templates comprises one or more of template texture, template font, template name of the presenter or template photo of the presenter of the conference presentation, wherein each conference participant of a plurality of conference participants configures the presentation templates and, wherein one or more conference participants of the plurality of conference participants configures an agenda of the web conference based on the access, and wherein the conference agenda is dynamically configured based on search parameters of the templates and the presenter of the conference presentation;

receiving a conference participant selection input that includes an intention indicator, wherein the intention indicator selectively distinguishes one or more presenters, wherein the intention indicator is based on the search parameters, wherein the selectively distinguished one or more presenters associated with the web conference are identified and selected based on the search parameters of at least one presenter, and wherein the search parameters include an identity of a template texture, template font, template name of the presenter and template photo of the presenter of the conference presentation;

determining an identity of the presenter during the conference presentation, wherein the identity is based on at least one of name of the presenter, presentation dates of the presenters, presentation topics of the presenters and matching the identity of the presenter against search parameters of the presenter, wherein matching the identity includes detecting voice, speech or presentation topics pertaining to the presenter during the conference presentation, wherein a plurality of presenters are distinguished, in response to receiving the conference participant selection input;

extracting the presentation templates in the repository based on the match, wherein a template crawler of the repository periodically collects presentation templates of the presenters, based on a plurality of search parameters of the presenters and, wherein, the collected presentation templates are stored in the repository for extracting presentation templates, based on the match;

applying the extracted presentation templates to presentation contents of the presentation program based on at least the intention indicator of the conference participant selection input, wherein the extracted presentation templates alters visual characteristics of the presentation content based on the applied presentation template, wherein the presentation program is a slideshow presentation, wherein the slideshow presentation comprises a plurality of slides, and wherein portions of the plurality of slides dynamically display contents of the presentation program to the conference participants based on the applied extracted presentation templates for each identified presenter during the conference presentation, and wherein the slidesnow presentation is dynamically configured based on the identity of the plurality of conference participants, and wherein the slideshow presentation is broadcasted over a network to the plurality of conference participants, based on the identity of the plurality of conference participants; and altering the extracted presentation templates to a slideshow presentation for each of the distinguished presenters of the plurality of distinguished presenters, wherein altering further includes dynamically applying the extracted presentation templates to the slideshow presentation, recording the applied extracted presentation templates In a template database, configuring the applied extracted presentation templates based on one or more of the presenter and the one or more conference participants, and transmitting the applied extracted presentation template to a user device.

2. The method according to claim 1, wherein the identity of the presenter is not defined within the presentation program and is unknown to the presentation program at the time the presentation program is executed during the conference presentation.

3. The method according to claim 1, wherein the step of receiving the request to access presentation templates in a repository further comprises the steps of:
- receiving a request from a participant to access presentation templates containing information of a presenter;
- authenticating credentials of the participant based on the request; and
- joining the participant to a conference broadcasted over a network based by one or more presenters.

4. The method according to claim 1, further comprising:
- transmitting the conference presentation to a conference computer.

5. The method according to claim 4, wherein the conference computer displays the conference presentation on a projector, and wherein the conference computer transmits the conference presentation to a plurality of client computers over a network.

* * * * *